US012709377B2

(12) United States Patent
Čretnik et al.

(10) Patent No.: US 12,709,377 B2
(45) Date of Patent: Aug. 18, 2026

(54) WING-FUSELAGE TRUSS JOINT

(71) Applicant: Pipistrel d.o.o., Ajdovščina (SI)

(72) Inventors: Gregor Čretnik, Ljubljana (SI); Filip Marinkovič, Ajdovščina (SI); Patrik Toš, Puče (SI)

(73) Assignee: Pipistrel d.o.o., Ajdovscina (SI)

( * ) Notice: Subject to any disclaimer, the term of this patent is extended or adjusted under 35 U.S.C. 154(b) by 147 days.

(21) Appl. No.: 18/591,363

(22) Filed: Feb. 29, 2024

(65) Prior Publication Data

US 2025/0276781 A1 Sep. 4, 2025

(51) Int. Cl.
*B64C 1/26* (2006.01)
*B64C 3/38* (2006.01)

(52) U.S. Cl.
CPC ................ *B64C 1/26* (2013.01); *B64C 3/385* (2013.01)

(58) Field of Classification Search
CPC .. B64C 1/26; B64C 3/38; B64C 3/385; B64C 27/06; B64C 27/12; B64C 27/18; B64C 27/31; B64D 27/40; B64D 27/402; B64D 27/404; B64D 27/406
See application file for complete search history.

(56) References Cited

U.S. PATENT DOCUMENTS 7,887,009 B2 2/2011 Keeler, Jr. et al.
9,248,902 B2 * 2/2016 Benthien ................. B64C 3/385
9,663,225 B1 5/2017 Kooiman et al.
9,981,750 B2 5/2018 Williams et al.
10,040,562 B2 8/2018 Kooiman et al.
2008/0272236 A1 * 11/2008 Rawdon .................... B64C 1/08 244/119
2011/0266398 A1 * 11/2011 Voss .......................... B64C 1/26 244/45 R
2023/0365247 A1 * 11/2023 Stevens .................. B64D 27/18
2026/0054822 A1 * 2/2026 Toš ........................... B64C 1/26

FOREIGN PATENT DOCUMENTS

CN 115009505 A * 9/2022 ................ B64F 5/10
DE 102005003296 A1 * 7/2006 ............. B64C 1/061
DE 102006027707 A1 * 12/2007 ............... B64C 1/10
(Continued)

OTHER PUBLICATIONS

Translation of DE 102005003296 A1 (Year: 2006).*
(Continued)

*Primary Examiner* — Joshua J Michener
*Assistant Examiner* — Ryan Andrew Yankey
(74) *Attorney, Agent, or Firm* — Avek IP, LLC

(57) ABSTRACT

A wing-fuselage truss joint assembly for an aircraft includes joining members secured to the aircraft's wing and fuselage structures. The joining members each include forward and aft wing joints and forward and aft fuselage joints connected by an upright member. The forward joining members are pivotally connected using interconnecting members and the aft joining members are connected using aft truss members. The forward-right and aft-right joining members and the forward-left and aft-left joining members are connected by truss link members and diagonal truss link members. The wing-fuselage truss joint assembly is configured to reduce forces experienced by the wing from being transferred to the aircraft fuselage.

20 Claims, 12 Drawing Sheets

(56) References Cited

FOREIGN PATENT DOCUMENTS

| | | | |
|---|---|---|---|
| EP | 3178737 | A1 | 6/2017 |
| EP | 3619108 | B1 | 11/2022 |

OTHER PUBLICATIONS

Extended European Search Report issued May 12, 2025 in EP Application No. 25159860.3, 12 pages.

Niu, Michael C. Y., Airframe Structural Design, 2nd Edition, ISBN 962-7128-09-0, Conmilit Press, Hong Kong, Feb. 1, 2002, pp. 408-409, XP002462359.

* cited by examiner

WING-FUSELAGE TRUSS JOINT

BACKGROUND OF THE INVENTION

1. Field

The disclosed embodiments relate generally to the field of aircraft. More specifically, the disclosed embodiments relate to the field of aircraft wing and fuselage connections.

2. Description of the Related Art

It is known to use pin joints to attach a wing to a fuselage on an aircraft. For example, in U.S. Pat. No. 7,887,009 to Keeler et al. the wing is attached to the fuselage using pin joints designed to transfer loads from the wings to the fuselage.

It is also known for a system to mount pylon assemblies in a tiltrotor aircraft. For example, in U.S. Pat. No. 10,040,562 to Kooiman et al. and U.S. Pat. No. 9,981,750 to Williams et al. describes similar systems using spherical bearings to secure pylons to a fuselage or for mounting other major aircraft components to an aircraft.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to a wing-fuselage truss joint assembly for an aircraft including a forward-left joining member, an aft-left joining member, a forward-right joining member, and an aft-right joining member configured to join a wing to a fuselage. Each of the joining members includes a wing truss joint mechanically coupled to a spar of the wing; a fuselage truss joint mechanically coupled to a bulkhead of the fuselage; and an upright member pivotally coupled to the wing truss joint at a first end and pivotally coupled to the fuselage truss joint at a second end; an interconnecting joint mechanically coupled to a forward bulkhead between the forward-left joining member and the forward-right joining member; at least one interconnecting member pivotally coupled to the interconnecting joint and pivotally coupled to a forward wing truss joint; a left diagonal linking member pivotally coupled to an aft-left fuselage truss joint and pivotally coupled to a forward-left wing truss joint; and a right diagonal linking member pivotally coupled to an aft-right fuselage truss joint and pivotally coupled to a forward-right wing truss joint.

In some embodiments, the techniques described herein relate to a wing-fuselage truss joint assembly for an aircraft including a forward-left joining member, an aft-left joining member, a forward-right joining member, and an aft-right joining member configured to join a wing to a fuselage. Each of the joining members includes a wing truss joint mechanically coupled to a spar of the wing; a fuselage truss joint mechanically coupled to a bulkhead of the fuselage; and an upright member pivotally coupled to the wing truss joint at a first end and pivotally coupled to the fuselage truss joint at a second end; an interconnecting joint mechanically coupled to a forward bulkhead between the forward-left joining member and the forward-right joining member; a first interconnecting member and a second interconnecting member wherein the first interconnecting member is pivotally coupled to the interconnecting joint and pivotally coupled to a forward-right wing truss joint and the second interconnecting member is pivotally coupled to the interconnecting joint and pivotally coupled to a forward-left wing truss joint; a right linking member pivotally coupled to an aft-right wing truss joint and pivotally coupled to the forward-right wing truss joint; and a left linking member pivotally coupled to an aft-left wing truss joint and pivotally coupled to the forward-left wing truss joint; a left diagonal linking member pivotally coupled to an aft-left fuselage truss joint and pivotally coupled to the forward-left wing truss joint; and a right diagonal linking member pivotally coupled to an aft-right fuselage truss joint and pivotally coupled to the forward-right wing truss joint.

In some embodiments, the techniques described herein relate to a wing-fuselage truss joint assembly for an aircraft including a forward-left joining member, an aft-left joining member, a forward-right joining member, and an aft-right joining member configured to join a wing to a fuselage. Each of the joining members includes a wing truss joint mechanically coupled to a spar of the wing; a fuselage truss joint mechanically coupled to a bulkhead of the fuselage; and an upright member pivotally coupled to the wing truss joint at a first end and pivotally coupled to the fuselage truss joint at a second end; an interconnecting joint mechanically coupled to a forward bulkhead between the forward-left joining member and the forward-right joining member; an interconnecting member pivotally coupled to the interconnecting joint and pivotally coupled to a forward wing truss joint; a left diagonal linking member pivotally coupled to an aft-left fuselage truss joint and pivotally coupled to a forward-left wing truss joint; and a right diagonal linking member pivotally coupled to an aft-right fuselage truss joint and pivotally coupled to a forward-right wing truss joint; an aft truss member pivotally coupled from an aft bulkhead to an aft wing truss joint.

BRIEF DESCRIPTION OF SEVERAL VIEWS OF THE DRAWINGS

Illustrative embodiments are described in detail below with reference to the attached drawing figures, which are incorporated by reference herein and wherein.

Figure 1:
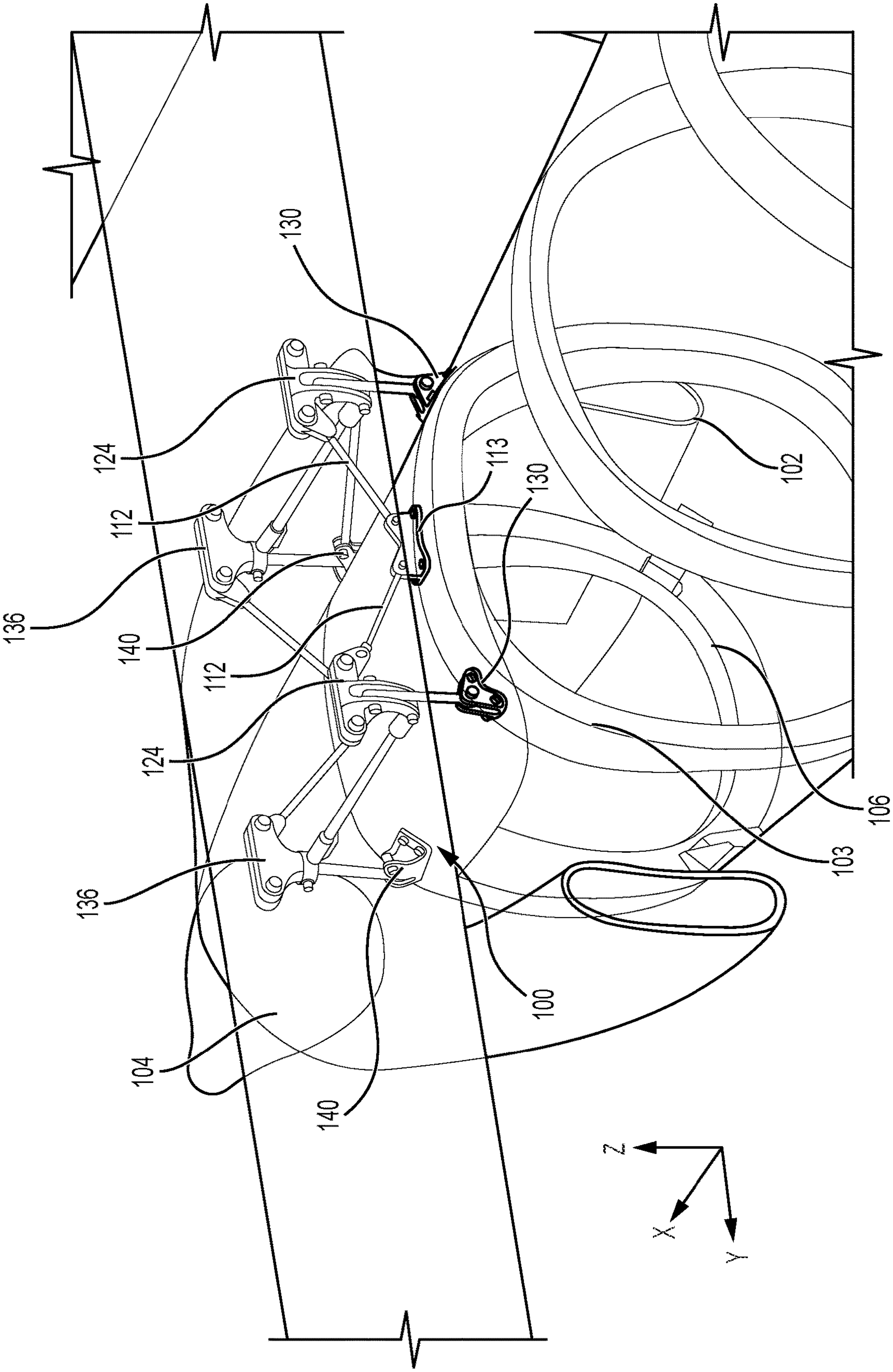
FIG. 1 is a perspective view showing a wing mounted to an aircraft fuselage via a wing-fuselage truss joint, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Connectors with high strength used for joining a wing and a fuselage together on an aircraft are essential for an aircraft structure to withstand aerodynamic and other types of loading. In current arrangements, a wing-fuselage joint may include a bolted joint connection which has high strength, but may have flexibility restrictions, and may require highly complex tooling for manufacture, increasing the cost and time of production. Additionally, specialized analysis is required for current wing-fuselage connections due to the presence of stress concentrations. The connectors must also be able to be rapidly assembled or disassembled to enable removal of the wing for facile transportation of the aircraft. A wing-fuselage joint is needed which may be assembled quickly while also being able to withstand various types of loads such as aerodynamic, ground reaction, vibration, shock, and thermal.

Embodiments disclosed herein provide an arrangement for connecting the wing and fuselage structures of an aircraft that incorporates truss members. The wing-fuselage truss joint in embodiments comprises a truss linkage including multiple linkage elements arranged in different orientations and planes. The wing-fuselage truss joint is designed to carry force loads in different directions while the truss linkage elements create a strong and flexible joint capable of withstanding numerous different types of loading such as aerodynamic, ground reaction, vibration, shock, and thermal types of loads. The wing-fuselage truss joint transfers shear forces experienced by an aircraft's wings in numerous directions with respect to the fuselage while substantially preventing the bending moment from being transferred to the fuselage structure. The substantial reduction or elimination of the bending moment to the fuselage allows for the fuselage size, complexity, cost, and manufacture time, to be reduced.

Figure 4A:
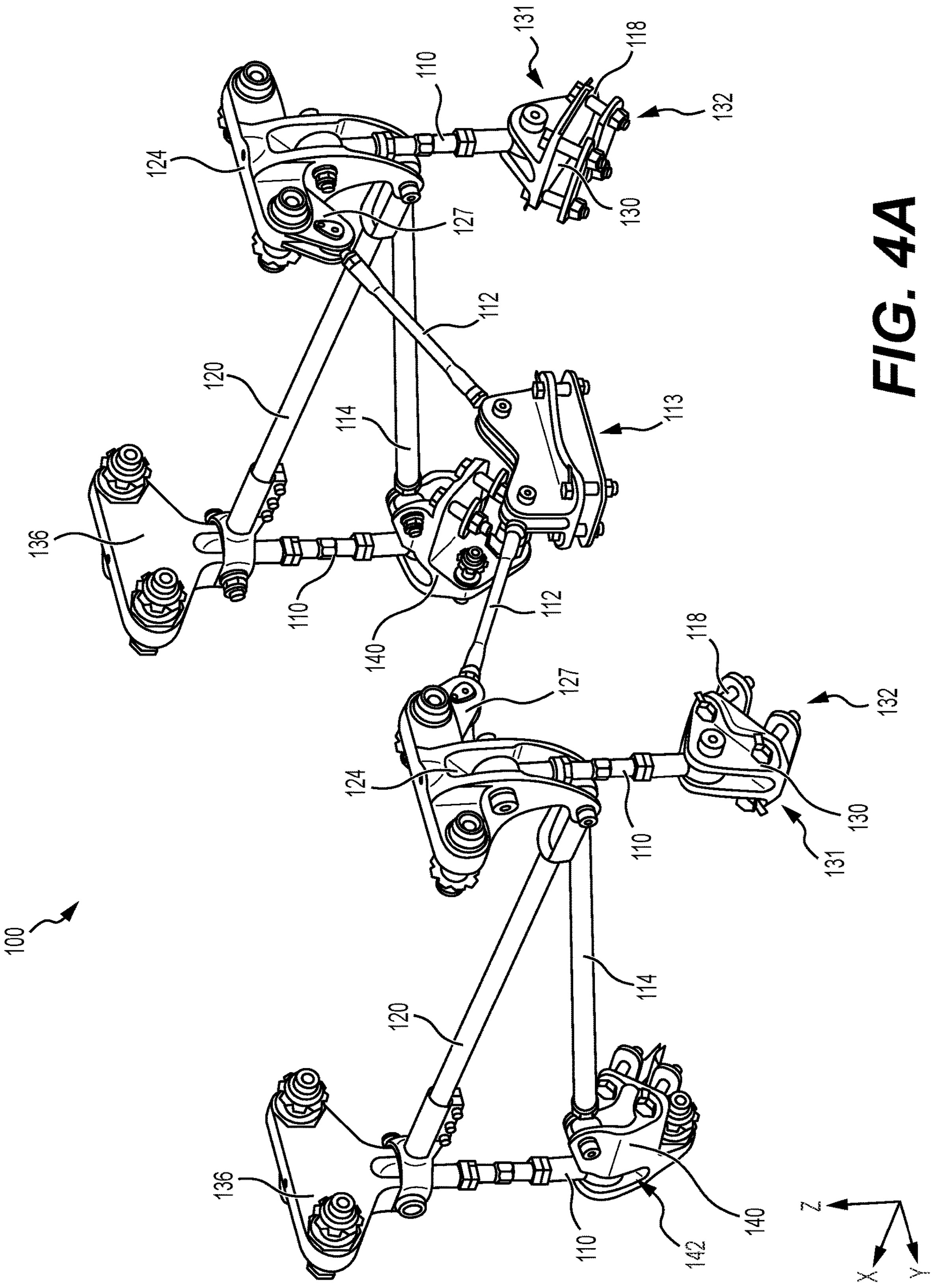
FIG. 4A is a perspective view of a first configuration of the wing-fuselage truss joint in an embodiment.
Figure 4B:
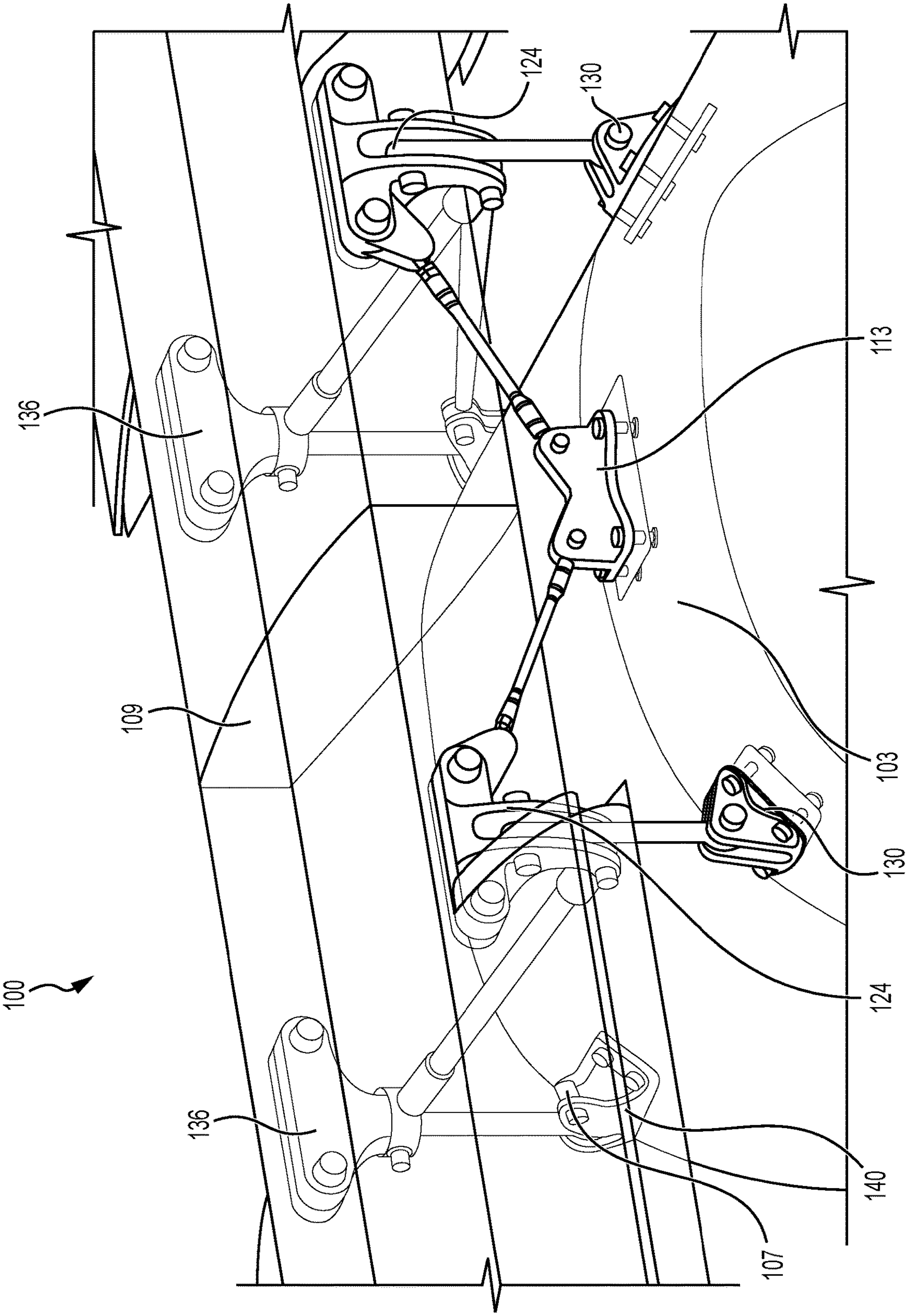
FIG. 4B is a perspective view of the first configuration of the wing-fuselage truss joint of FIG. 4A mounted to an aircraft structure.

FIG. 1 shows a wing-fuselage truss joint assembly 100 mounted onto an aircraft structure in an embodiment. The wing-fuselage truss joint assembly 100 is configured for mounting a wing 104 to a fuselage structure 102. The fuselage structure 102 for example is a pair of adjacent girderss or fuselage rib-like members of a frame and includes the forward bulkhead 103 and the aft bulkhead 106. The wing 104 includes forward spar 107 and aft spar 109 which provide structural support for the wing 104 (FIG. 4B). The bulkheads 103 and 106 of the fuselage structure 102 and the spars 107 and 109 of the wing 104 provide structural support for the fuselage and the wings of an aircraft respectively. The wing-fuselage truss joint assembly 100 is mounted to members of both the fuselage structure 102 and the wing 104 which mechanically couples the fuselage structure 102 and the wing 104 together. In embodiments, the wing 104 is configured as an upper wing mounted to a top side of the fuselage structure 102.

The wing-fuselage truss joint assembly 100 comprises four joining members including a forward wing truss joint 124, a forward fuselage truss joint 130, an aft wing truss joint 136, and an aft fuselage truss joint 140. The forward wing truss joint 124 mechanically couples to the forward spar 107 of the wing 104, the aft wing truss joint 136 mechanically couples to the aft spar 109, the forward fuselage truss joint 130 mechanically couples to the forward bulkhead 103 and the aft fuselage truss joint 140 mechanically couples to the aft bulkhead 106. An interconnecting joint 113 is mechanically coupled to the forward bulkhead 103. Interconnecting members 112 are configured to span between the forward wing truss joints 124 and the interconnecting joint 113.

In embodiments and with reference to FIG. 1, the X direction is defined as a longitudinal direction aligned forward and aft along the length of the fuselage, the Y direction is a lateral direction that spans left and right across the aircraft in the main direction of the wings, and the Z direction is a vertical direction aligned up and down. The wing-fuselage truss joint assembly 100 is configured to reduce reaction forces in the X and Y directions from transferring to the fuselage structure 102 while substantially preventing moment forces and bending moments from being transferred to the fuselage structure 102.

Figure 2A:
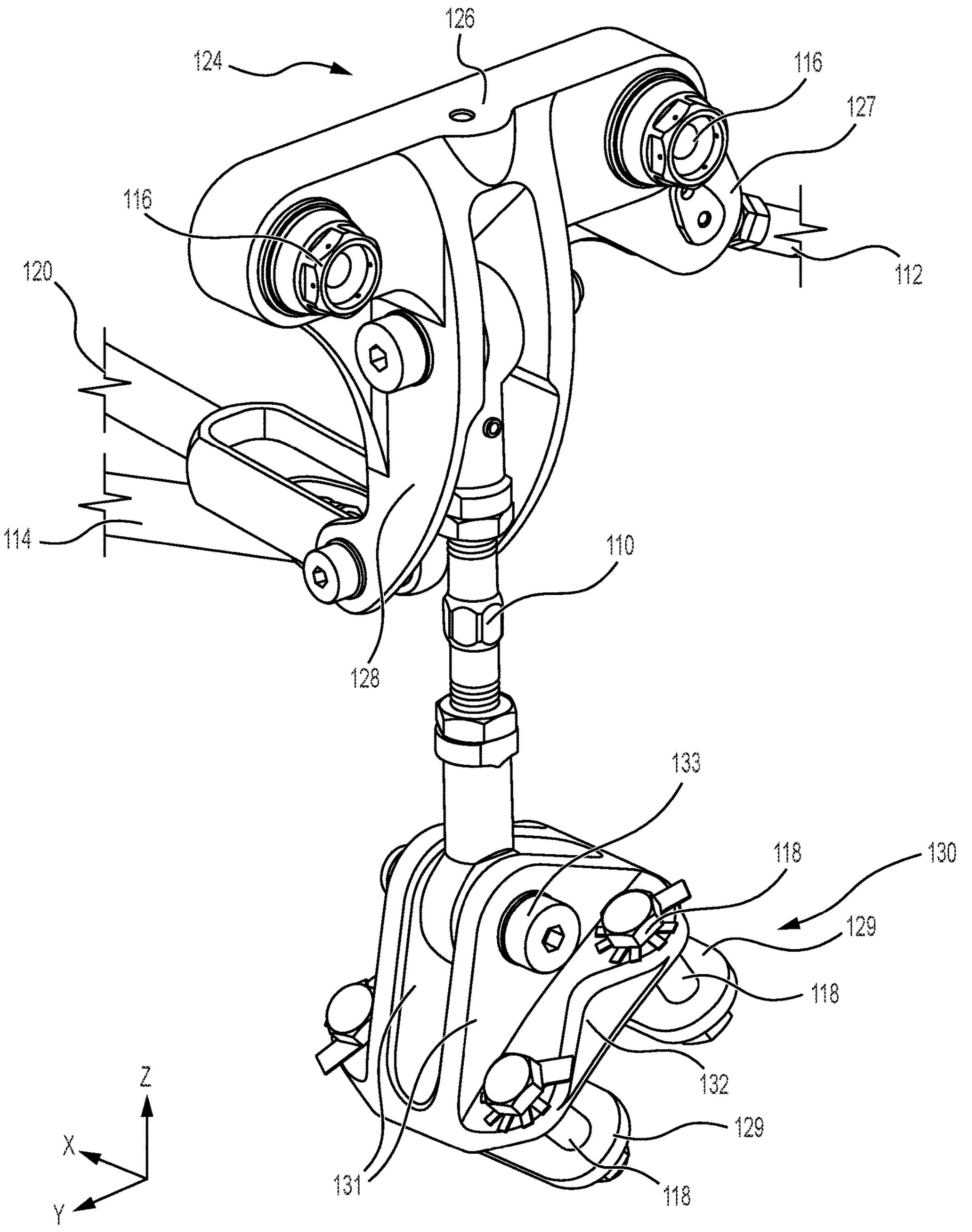
FIG. 2A is a front perspective view showing a front joining member of the wing-fuselage truss joint of FIG. 1.

FIG. 2A shows a close-up front perspective view of a forward joining member including the forward wing truss joint 124 and forward fuselage truss joint 130 shown in FIG. 1 on the forward left and forward right of the wing-fuselage truss joint assembly 100. The forward wing truss joint 124 includes a base plate 126 including securing arrangements 116. The securing arrangements 116 may be a nut and bolt arrangement and are configured on the base plate 126 to mount the forward wing truss joint 124 to a structural member of the wing 104, such as the forward spar 107. The base plate includes a flanged extension 128 which downwardly extends and curves to an end configured to pivotally receive an end of a truss link member 120 and an end of the diagonal truss link member 114. The truss link member 120 and the forward wing truss joint 124 are coupled pivotally together such that each may pivot in the X-Z plane relative to the forward wing truss joint 124. One securing arrangement 116 on the base plate 126 includes a pivotally mounted pivot bar 127 which is coupled to the interconnecting member 112 (FIG. 2C). The interconnecting member 112 is pivotally mounted to the pivot bar 127 at one end and is pivotally mounted at its other end to the interconnecting joint 113 (FIG. 2C). A vertical link 110 is configured to attach to the base plate 126 and extend downwards connecting to the forward fuselage truss joint 130. The vertical link 110 is pivotally received by the forward fuselage truss joint 130 into a channel between two flanges 131 each extending away from a mounting base 132. The flanges 131 include a securing element 133 extending laterally across the channel pivotally securing the vertical link 110 to the forward fuselage truss joint 130. The mounting base 132 includes securing arrangements 118 which are each configured to secure the forward fuselage truss joint 130 to members of the fuselage structure 102.

Figure 2B:
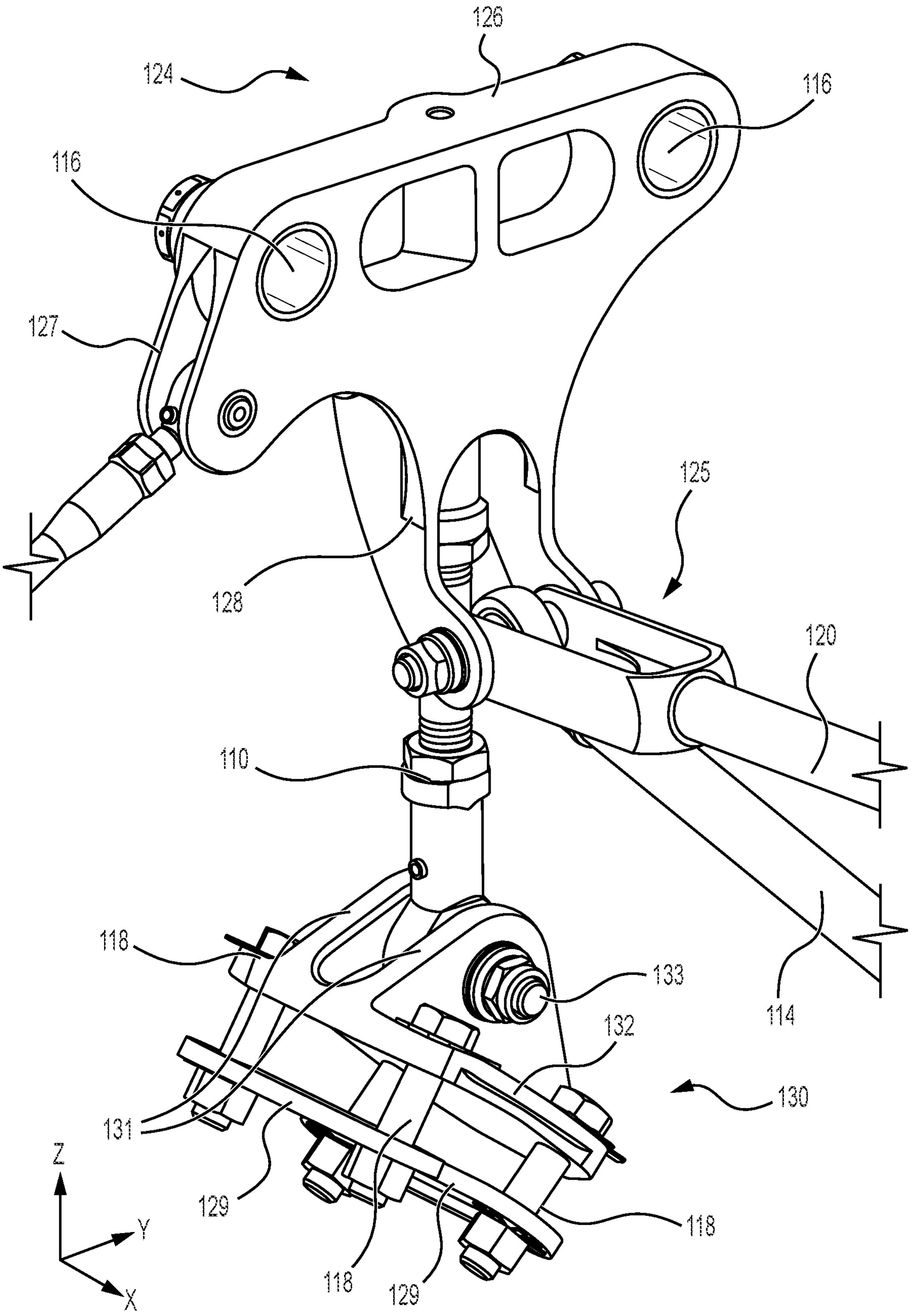
FIG. 2B is a rear perspective view showing the front joining member of the wing-fuselage truss joint of FIG. 1.
Figure 2C:
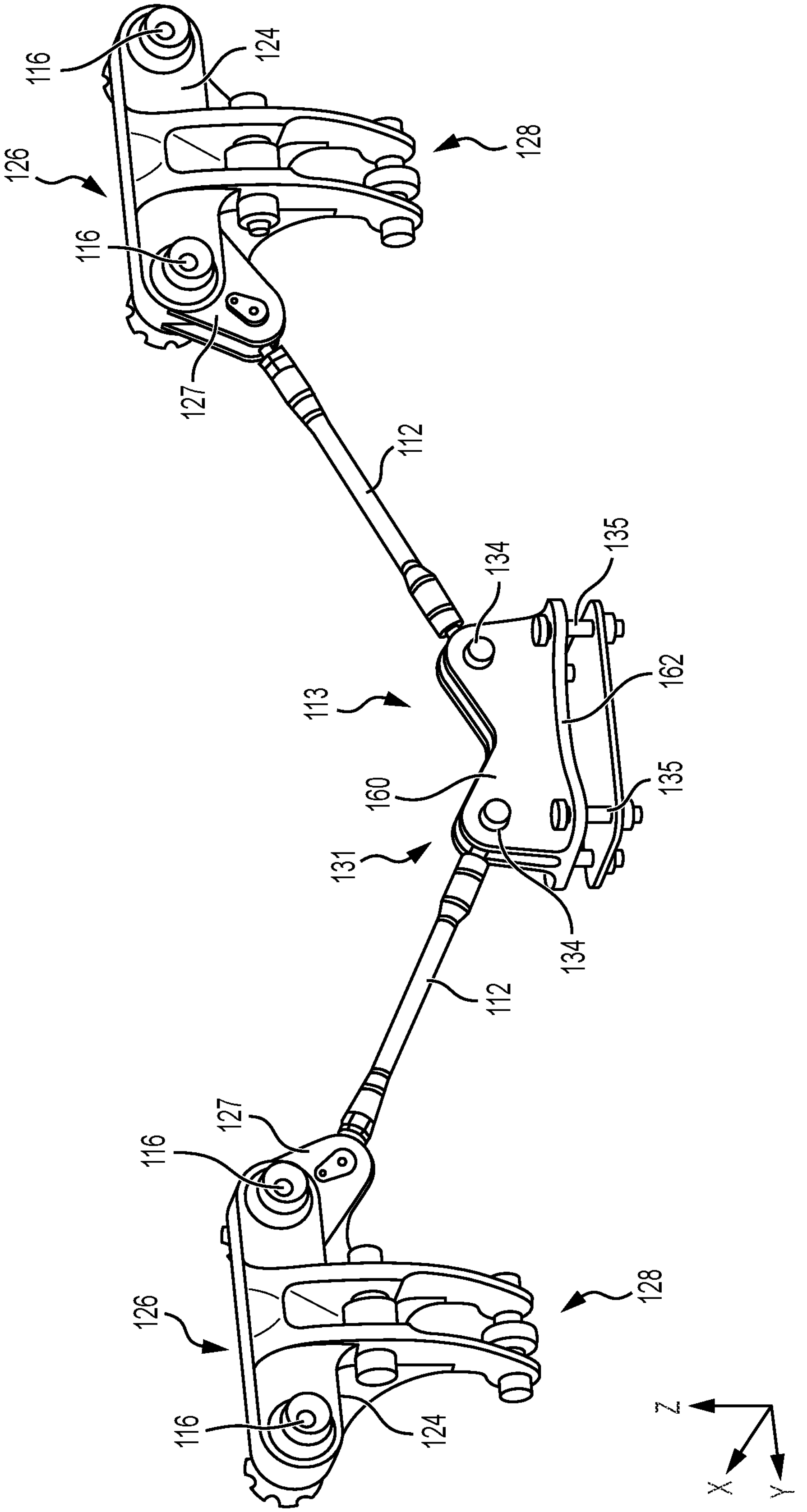
FIG. 2C is a perspective view showing an interconnecting joint of the wing-fuselage truss joint of FIG. 1.

FIG. 2B shows a close-up rear perspective view of the forward joining member of FIG. 2A. The truss link member 120 includes a channeled end 125. The channeled end 125 includes sidewalls spaced apart such that an end of the diagonal truss link member 114 may be pivotally secured in between the sidewalls of the channeled end 125. The channeled end 125 of the truss link member 120 and the diagonal truss link member 114 are pivotally secured at the end of the flanged extension 128 of the forward wing truss joint 124. The forward fuselage truss joint 130 is pivotally secured at a lower end of the vertical link 110 by the securing element 133 laterally extending between the two flanges 131 outcropped from the mounting base 132. At each of the four corners of the square shaped mounting base 132, the securing arrangements 118 are each inserted into a fastener hole in the mounting base 132. The securing arrangement 118 may be a nut and bolt configured such that the bolt head is positioned on the upper surface of the mounting base 132 such that the shaft of the bolt extends downwards and through the fastener hole in the mounting base 132. As each bolt shaft extends downwards one end of a fastener plate 129 is slid onto the bolt shaft with a nut being threadingly secured onto the upper end of the bolt shaft. The mounting base 132 includes two fastener plates 129 with one fastener plate 129 being inserted on one end of the forward-right securing arrangement 118 and on the other end being inserted onto the back-right securing arrangement 118. Another fastener plate 129 is inserted onto the forward-left securing arrangement 118 and on the other end is inserted onto the back-left securing arrangement 118. The fastener plates 129 span from the forward to the back edges of the mounting base 132 and are positioned along the left and right sides of the mounting base 132. The fastener plates 129 are used to secure the forward fuselage truss joint 130 to the forward bulkhead 103 of the fuselage structure 102. FIG. 2F shows a perspective view of the forward fuselage truss joint 130 wherein the forward bulkhead 103 is sandwiched in between the fastener plates 129 and the mounting base 132 with the securing arrangements 118 passing through the forward bulkhead 103. The securing arrangements 118 may be tightened to secure the forward bulkhead 103 in between the fastener plates 129 and mounting base 132.

FIG. 2C shows a close-up perspective view of the interconnecting joint 113 with the interconnecting members 112 connecting the interconnecting joint 113 to the forward joining members and more specifically the forward wing truss joints 124. The interconnecting joint 113 includes a base plate 160 which includes securing arrangements 134 positioned on opposing sides which pivotally secure an end of each interconnecting member 112 connecting to the forward wing truss joints 124. The interconnecting joint 113 includes a base 162 which having fasteners 135 configured to secure the interconnecting joint 113 to the fuselage structure 102. The pivotal attachment of each of the interconnecting members 112 allows for the forward wing truss joint 124 to pivot relative to the fuselage structure 102 and the interconnecting joint 113.

Figure 2D:
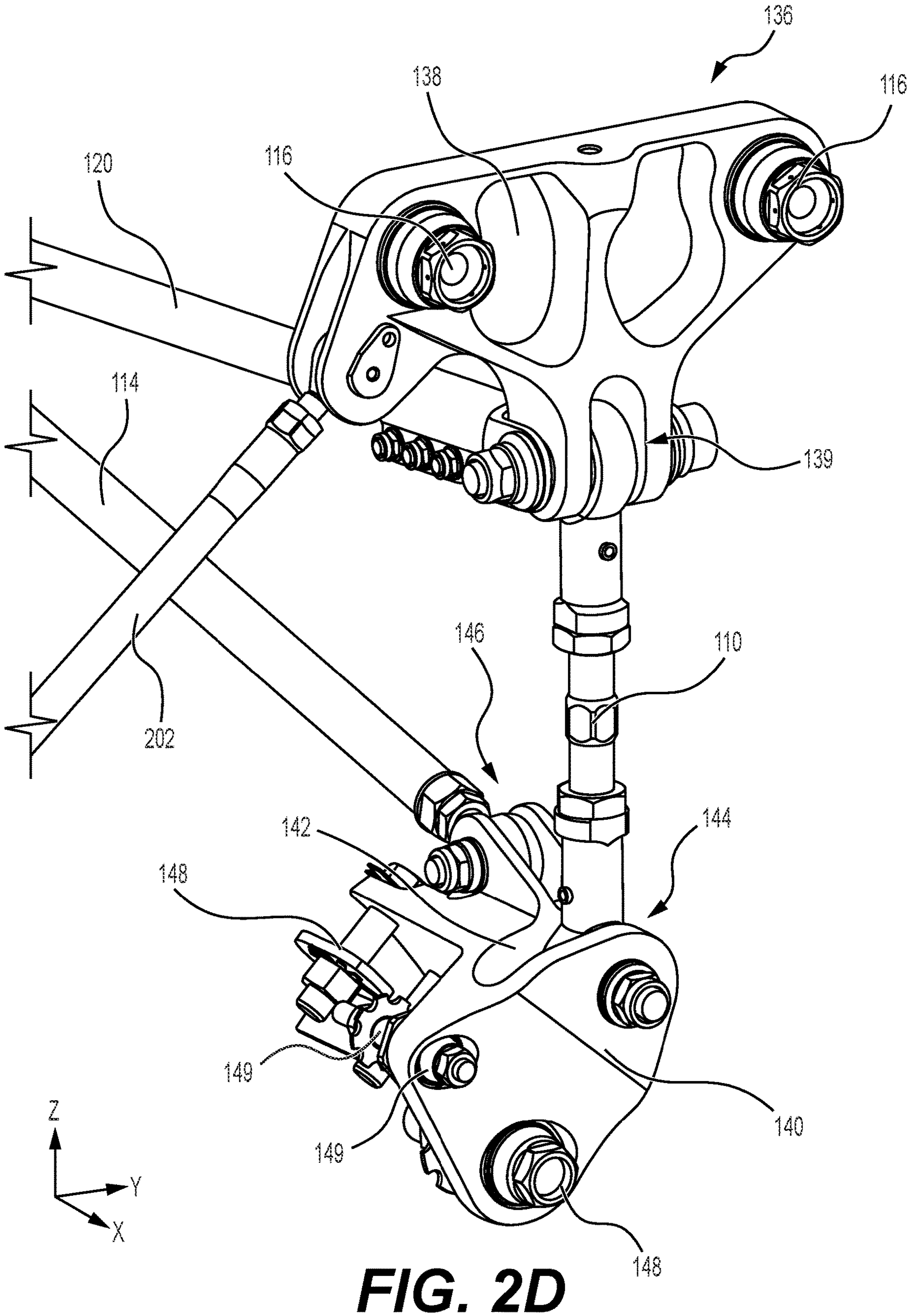
FIG. 2D is a front perspective view showing a rear joining member of the wing-fuselage truss joint of FIG. 1.

FIG. 2D shows a close-up front perspective view of an aft joining member including the aft wing truss joint 136 and aft fuselage truss joint 140 as shown in FIG. 1 on the aft right and the aft left of the wing-fuselage truss joint assembly 100. The aft wing truss joint 136 includes a base plate 138 including the securing arrangements 116. The securing arrangements 116 are similar to those on the forward wing truss joint 124 and are configured on the base plate 138 to mount the aft wing truss joint 136 to a structural member such as the aft spar 109 of the wing 104. The base plate 138 includes a pivotal connection 139 wherein the vertical link 110 and the truss link member 120 are pivotally coupled together and allow the truss link member 120 and the vertical link 110 to pivot in the X-Z plane independently of one another. The vertical link 110 extends downwards to the aft fuselage truss joint 140. The aft fuselage truss joint 140 is configured with a channeled aperture 142 opening having a pivotal connection 144 to pivotally connect the vertical link 110.

Figure 2E:
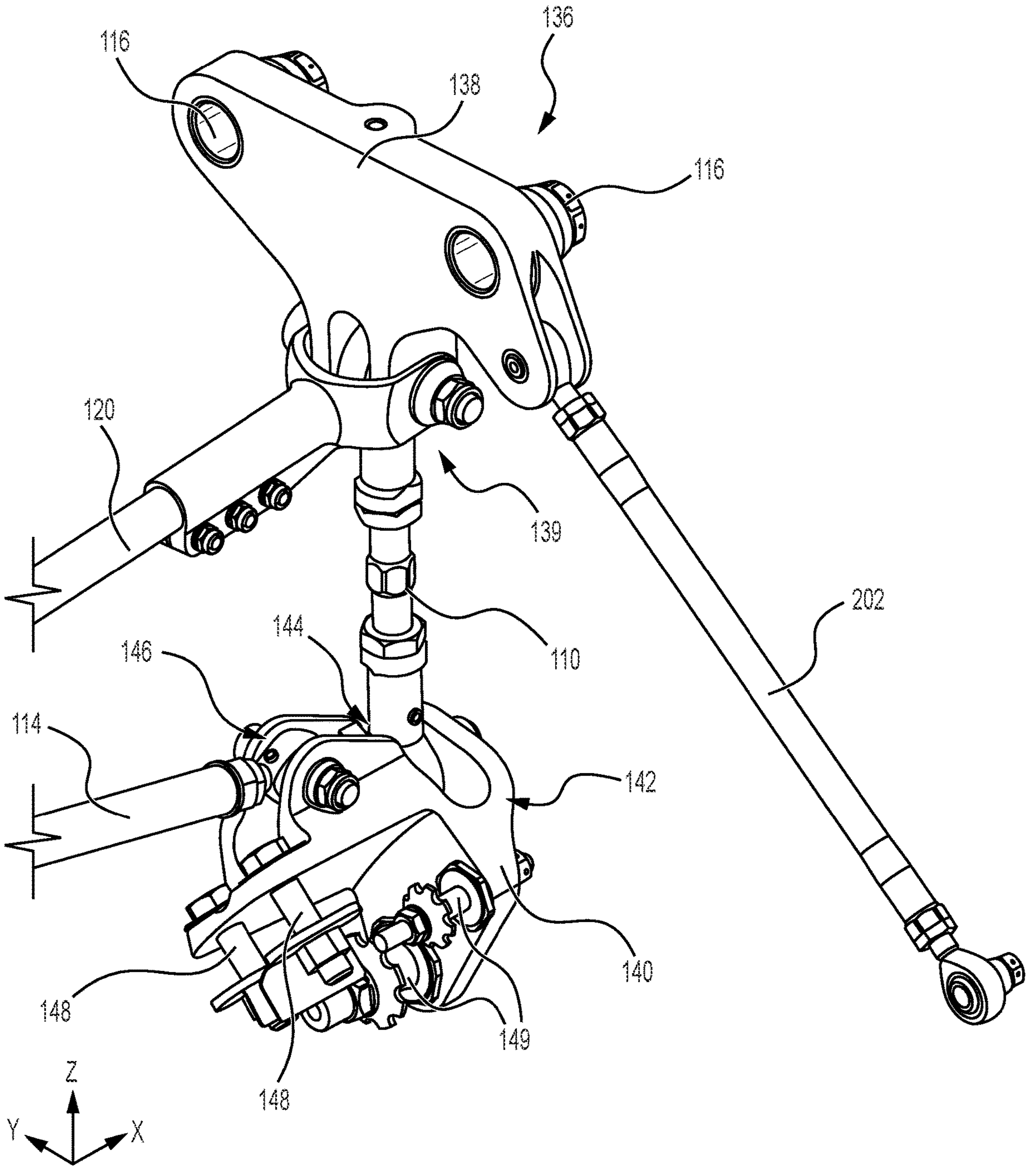
FIG. 2E is a rear perspective view showing the rear joining member of the wing-fuselage truss joint of FIG. 1.
Figure 2F:
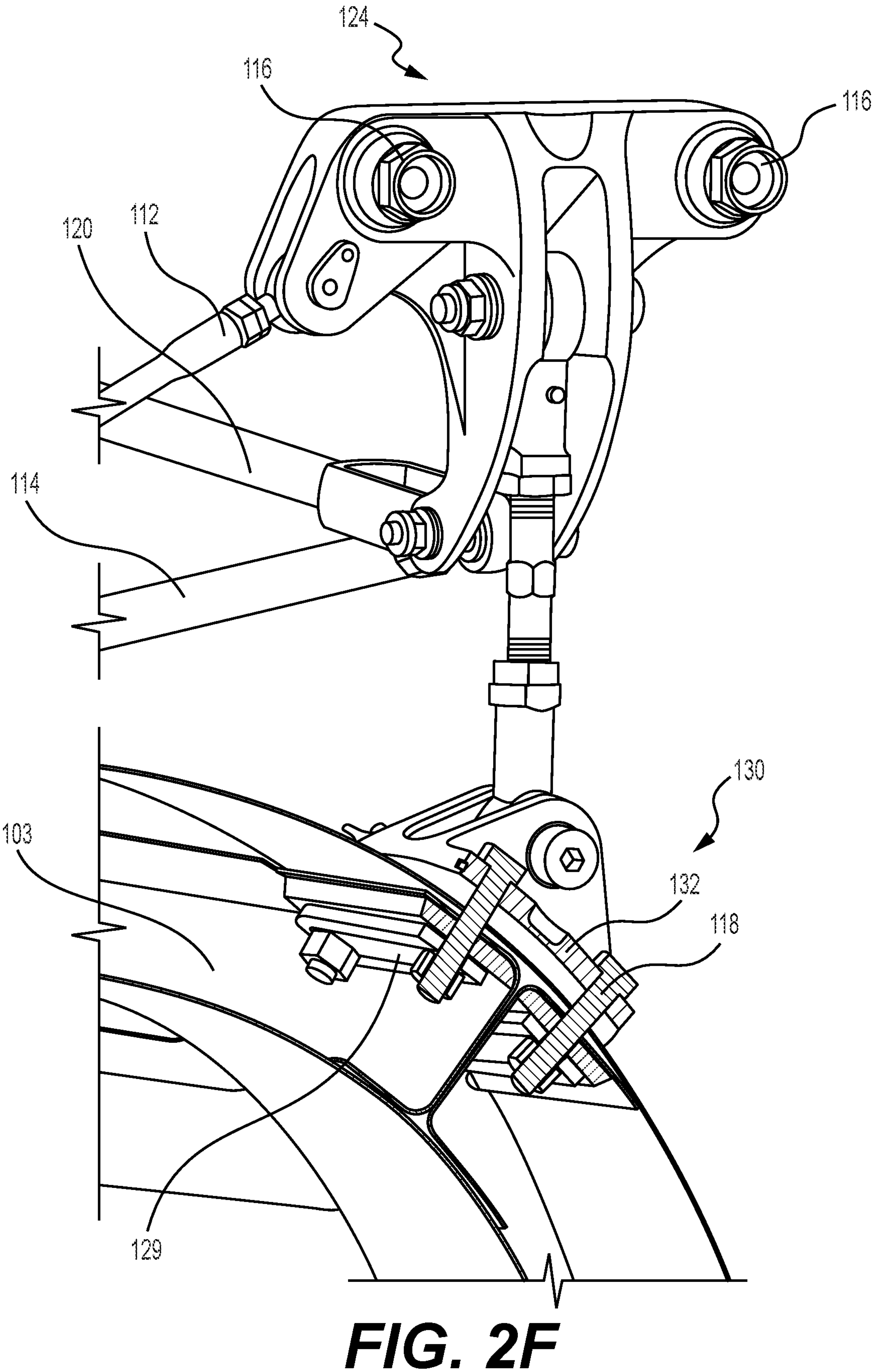
FIG. 2F is a front perspective view of the front joining member of the wing-fuselage truss joint of FIG. 1 installed onto a forward bulkhead.
Figure 3:
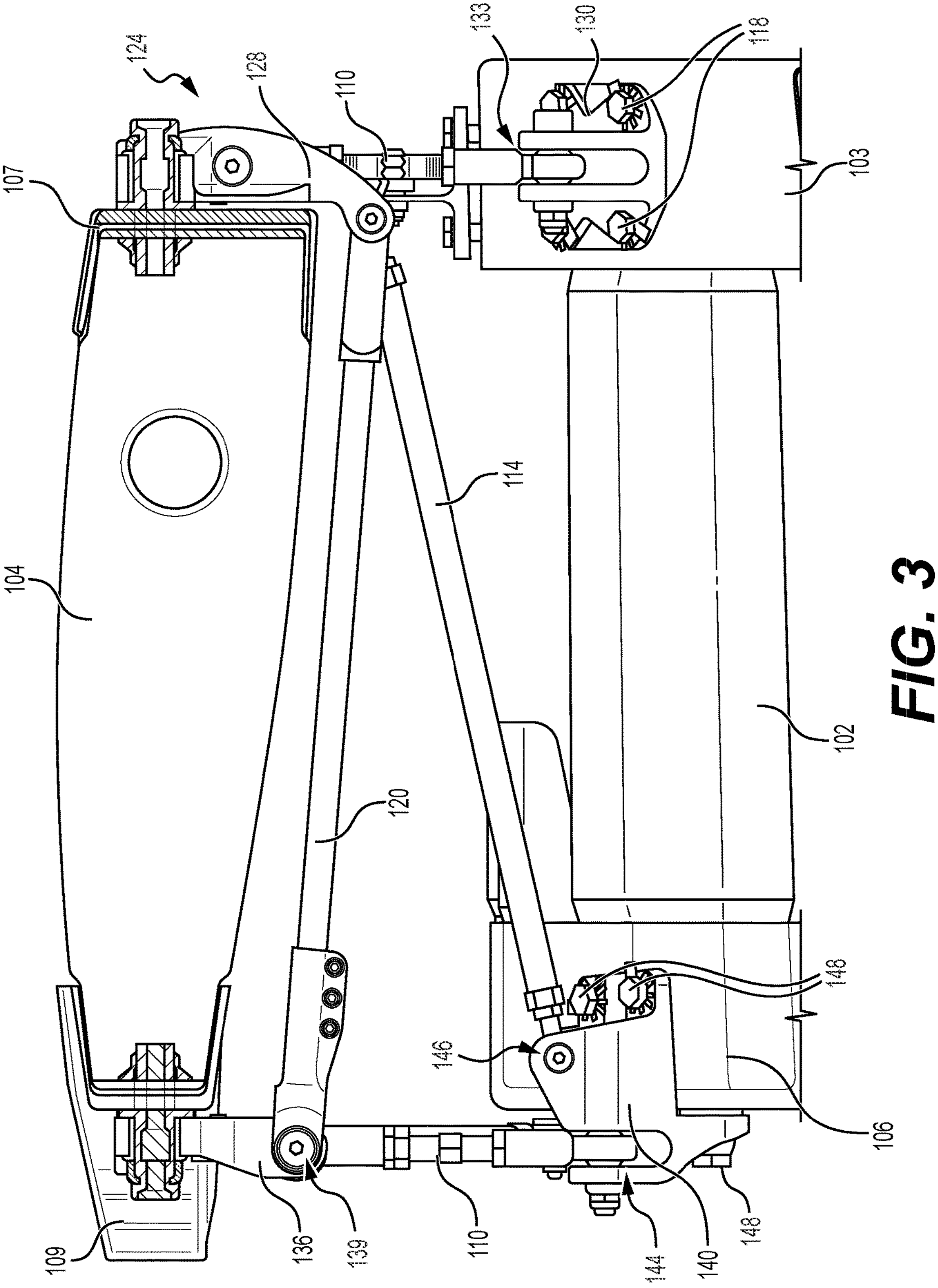
FIG. 3 is a side view showing the wing-fuselage truss joint of FIG. 1.

FIG. 2E shows a rear perspective view of the aft joining member of FIG. 2D. The aft fuselage truss joint 140 includes fastening bolts 148 and shear pins 149 used to secure the aft fuselage truss joint 140 to the aft bulkhead 106 (FIG. 3). In embodiments, the fastening bolts 148 may be a nut, washer, and bolt arrangement. In embodiments when viewing FIGS. 2D and 2E together, the fastening bolts 148 are configured such that the fastening bolts 148 are positioned perpendicularly to the shear pins 149 allowing the aft fuselage truss joint 140 to be secured onto an edged side of the aft bulkhead 106 (as shown in FIG. 3). In embodiments, the shear pins 149 are laminated and are configured to substantially carry the vertical load on the aft fuselage truss joint 140. The aft fuselage truss joint 140 includes the pivotal connection 146 pivotally connecting the diagonal truss link member 114 to the aft fuselage truss joint 140.

The interconnecting members 112 and the interconnecting joint 113 (FIG. 2C) allows for forces experienced by the wings in the Y direction to be transferred to the fuselage structure 102. The interconnecting member 112 is pivotally connected on one end to the interconnecting joint 113 and on the other end to the pivot bar 127. The pivot bar 127 is pivotally connected to the forward wing truss joint 124 via securing arrangement 116. The linkage created between the interconnecting joint 113, interconnecting members 112, the pivot bar 127, and the forward wing truss joint 124 allow for each forward wing truss joint 124 to pivot in the Y-Z plane relative to the aircraft fuselage structure 102. For instance, when a force is experienced by the wing 104, the pivotal connection allows for the interconnecting members 112 to pivot in the Y-Z plane relative to the interconnecting joint 113 mounted to the fuselage structure 102 (FIG. 1). Movement of the interconnecting members 112 in the Y-Z plane substantially allows for the forces experienced by the wing 104 in the Y direction to be transferred to the fuselage structure 102.

FIG. 3 shows a side view of the wing-fuselage truss joint assembly 100. The forward wing truss joint 124 and the aft wing truss joint 136 are connected to the forward spar 107 and the aft spar 109 of the wing 104 respectively, and the forward fuselage truss joint 130 and aft fuselage truss joint 140 are connected, respectively, to the forward bulkhead 103 and aft bulkhead 106 of the fuselage structure 102. The truss link member 120 is pivotally connected at one end to the aft wing truss joint 136 at the pivotal connection 139 and at the other end to the the flanged extension 128 of the forward wing truss joint 124. The diagonal truss link member 114 is pivotally connected at one end to the pivotal connection 146 on the aft fuselage truss joint 140 and at the other end to the flanged extension 128 of the forward wing truss joint 124. The pivotal connection of the diagonal truss link member 114 between the aft fuselage truss joint 140 and the forward wing truss joint 124 limits the wing 104 from pivoting in the X-Z plane and limits the movement of the wing 104 in the X direction relative to the fuselage structure 102. For instance, when a force is experienced by the wing 104, the pivotal connection of the diagonal truss link member 114 limits the wing 104 from pivoting in the X-Z plane and limiting the movement of the wing 104 in the X direction (i.e., front and back). Limited movement of the diagonal truss link member 114 in the X-Z plane substantially allows for the forces experienced by the wing 104 in the X direction to be transferred to the fuselage structure 102.

The wing-fuselage truss joint assembly 100 allows for the forces experienced by the wing 104 to be transferred to the fuselage structure 102 in the X, Y, and Z directions while limiting and substantially eliminating the bending moment from being transferred to the fuselage structure 102. The interconnecting joint 113 is configured to allow the forward wing truss joint 124 to pivot in the Y-Z plane (see FIG. 2C) while the truss link member 120 and the diagonal truss link member 114 (see FIG. 3) allow the forward wing truss joint 124 and aft wing truss joint 136 to be substantially connected. The vertical link 110 and interconnecting members 112 each pivotally connected to the forward wing truss joint 124 and substantially prevent a moment force experienced by the wings 104 to be transferred to the fuselage structure 102. The allowed pivotal movement of the interconnecting members 112 (Y-Z plane) and the diagonal truss link member 114 and truss link member 120 (X-Z plane) allow for substantially less of the forces experienced by the wing 104 in the X and Y directions to be transferred from the wing 104 to the fuselage structure 102.

The wing-fuselage truss joint assembly 100 may be configured in numerous different ways to provide desired force transmission to the fuselage. FIG. 4A shows a perspective view of the wing-fuselage truss joint assembly 100. The wing-fuselage truss joint assembly 100 includes a forward wing truss joint 124 and a forward fuselage truss joint 130, and an aft wing truss joint 136 and an aft fuselage truss joint 140. The diagonal truss link member 114 connects a forward wing truss joint 124 with an aft fuselage truss joint 140 on each side, and truss link member 120 connects a forward wing truss joint 124 with an aft wing truss joint 136 on each side. The forward wing truss joints 124 are each connected with an interconnecting joint 113 via one of the interconnecting members 112. The wing-fuselage truss joint assembly 100 is shown mounted to the fuselage structure 102 and the wing 104 in FIG. 4B. The wing-fuselage truss joint assembly 100 of FIG. 4A and FIG. 4B allows for the forces experienced by the wing 104 in the X and Y direction to be substantially reduced and transferred to the fuselage structure 102 while the forces created from a bending moment in the wing 104 is minimally transferred and possibly eliminated from travelling to the fuselage structure 102.

Figure 5B:
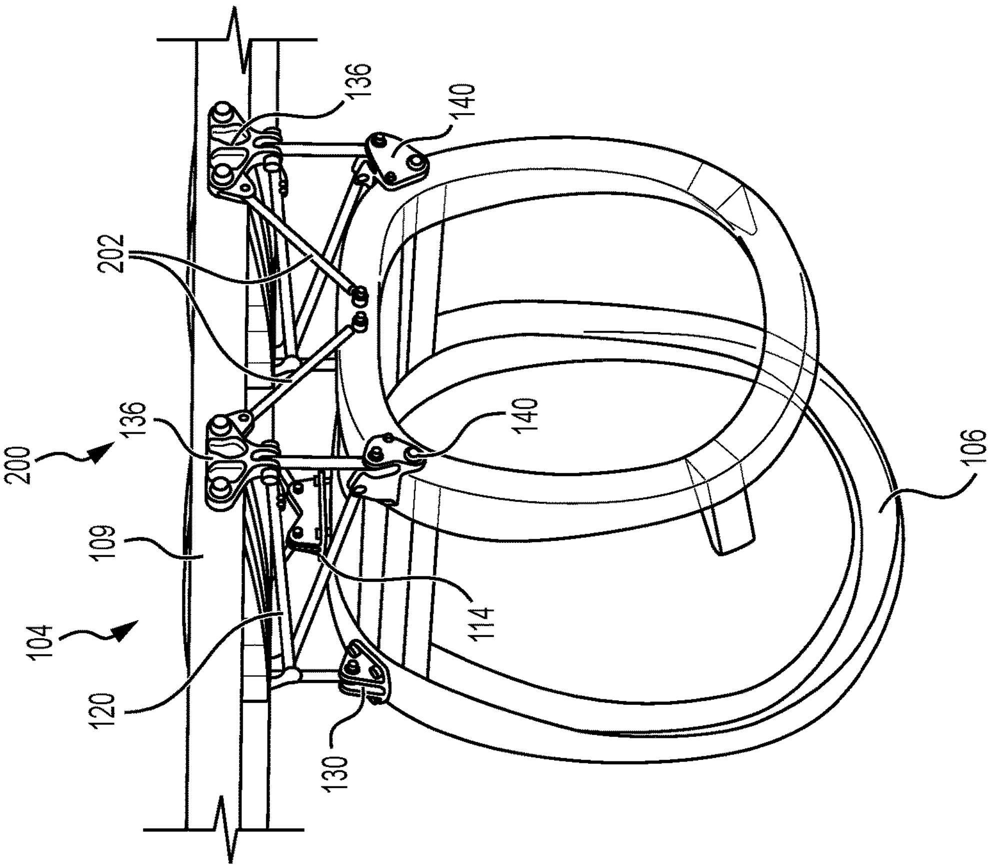
FIG. 5B is a perspective view opposite that of FIG. 5A showing the second configuration of the wing-fuselage truss joint mounted to an aircraft structure.
Figure 5A:
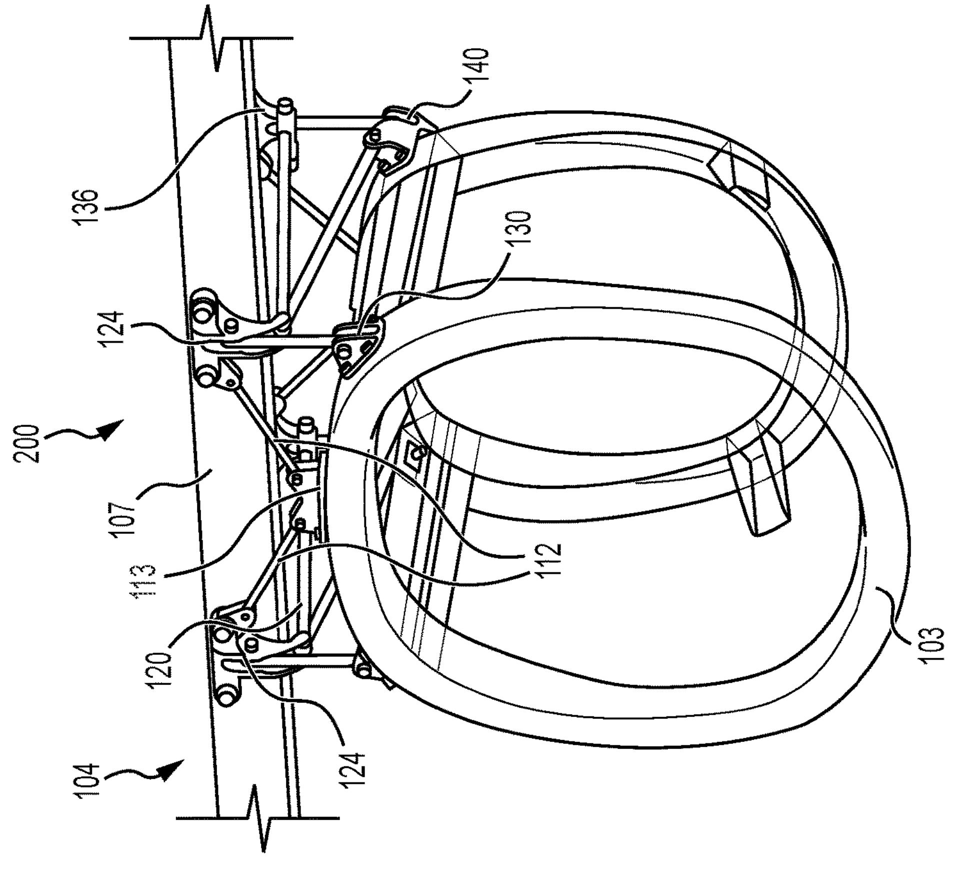
FIG. 5A is a perspective view showing a second configuration of the wing-fuselage truss joint mounted to an aircraft structure in an embodiment.

FIGS. 5A and 5B show a wing-fuselage truss joint assembly 200, which is similar to the wing-fuselage truss joint assembly 100. FIG. 5A provides a front perspective view of the wing-fuselage truss joint assembly 200 and FIG. 5B provides a rear perspective view of the wing-fuselage truss joint assembly 200. The wing-fuselage truss joint assembly 200 is configured similarly to wing-fuselage truss joint assembly 100 of FIG. 4A and FIG. 4B, except with additional truss members added. Specifically, the wing-fuselage truss joint assembly 200 further includes a pair of aft truss members 202 connected from the aft wing truss joint 136 directly to the aft bulkhead 106 of the fuselage structure 102 instead of using an interconnecting joint 113. The aft truss members 202 are configured on each of the aft wing truss joints 136 and extend downwards at an angle to be mounted to the aft bulkhead 106 of the fuselage structure 102. The wing-fuselage truss joint assembly 200 may be used when additional truss links are required for transmission of force loads in the Y direction. The aft truss members 202 are pivotally connected to each aft wing truss joint 136 and pivotally connected to the fuselage structure 102 (aft bulkhead 106) such that forces in the Y direction are transferred to the fuselage structure 102 and rotational moments, such as bending moments, are not transferred to the fuselage structure 102.

Figure 6B:
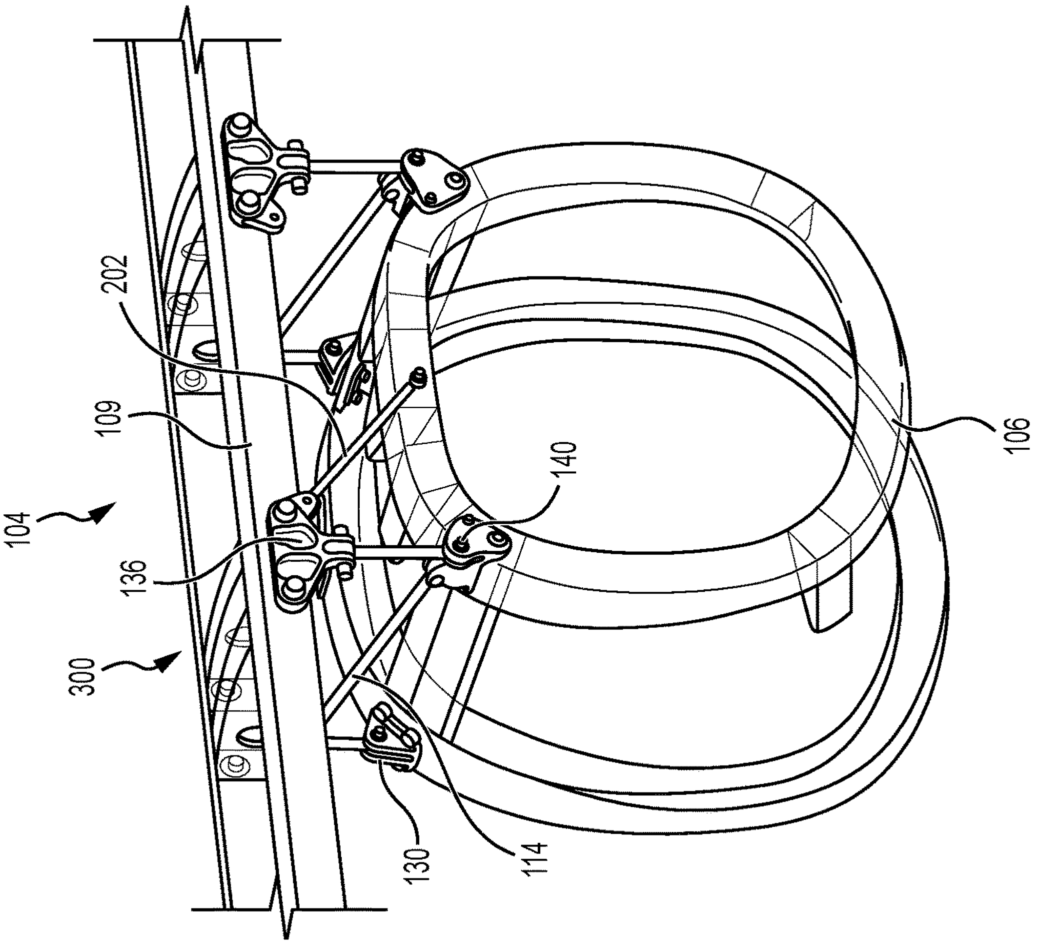
FIG. 6B is a perspective view opposite that of FIG. 6A showing the third configuration of the wing-fuselage truss joint mounted to an aircraft structure.
Figure 6A:
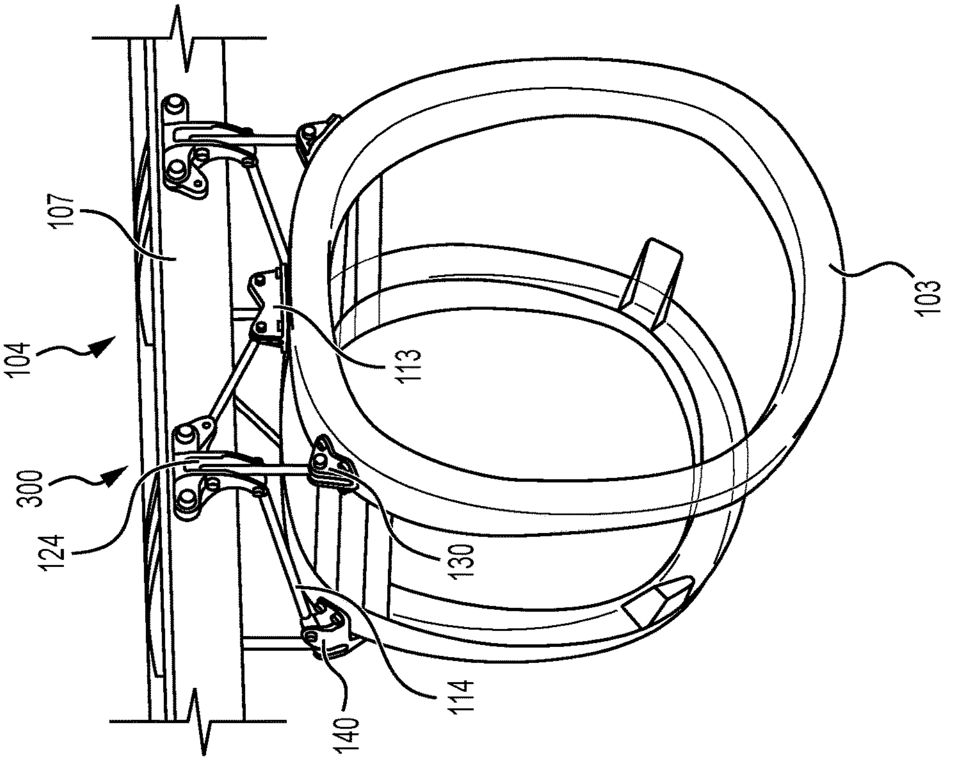
FIG. 6A is a perspective view showing a third configuration of the wing-fuselage truss joint mounted to an aircraft structure in an embodiment.

FIGS. 6A and 6B show a wing-fuselage truss joint assembly 300, which is similar to the wing-fuselage truss joint assembly 100. FIG. 6A provides a front perspective view of the wing-fuselage truss joint assembly 300 and FIG. 6B provides a rear perspective view of the wing-fuselage truss joint assembly 300. The wing-fuselage truss joint assembly 300 is configured similarly to the first and second wing-fuselage truss joint assemblies 100 and 200 with some truss members eliminated. Specifically, in wing-fuselage truss joint assembly 300, the truss link members 120, a single interconnecting member 112, and a single rear truss member 202 are eliminated. The wing-fuselage truss joint assembly 300 may be used for transmission of force loads in all directions while limiting the amount of bending forces transferred to the fuselage structure 102 and being able to provide strength for rotational loads or moments around the Z-axis. In comparison, the wing-fuselage truss joint assembly 200 may allow more bending forces to transfer to the fuselage structure 102 than the wing-fuselage truss joint assembly 300.

Features described above as well as those claimed below may be combined in various ways without departing from the scope hereof. The following clauses illustrate some possible, non-limiting combinations:

Clause 1. A wing-fuselage truss joint assembly for an aircraft comprising: a forward-left joining member, an aft-left joining member, a forward-right joining member, and an aft-right joining member configured to join a wing to a fuselage, wherein each of the joining members comprises: a wing truss joint mechanically coupled to a spar of the wing; a fuselage truss joint mechanically coupled to a bulkhead of the fuselage; and an upright member pivotally coupled to the wing truss joint at a first end and pivotally coupled to the fuselage truss joint at a second end; an interconnecting joint mechanically coupled to a forward bulkhead between the forward-left joining member and the forward-right joining member; at least one interconnecting member pivotally coupled to the interconnecting joint and pivotally coupled to a forward wing truss joint; a left diagonal linking member pivotally coupled to an aft-left fuselage truss joint and pivotally coupled to a forward-left wing truss joint; and a right diagonal linking member pivotally coupled to an aft-right fuselage truss joint and pivotally coupled to a forward-right wing truss joint.

Clause 2. The wing-fuselage truss joint assembly of clause 1 wherein a right truss link member pivotally connects from the aft-right joining member to the forward-right joining member and a left truss link member pivotally connects from the aft-left joining member to the forward-left joining member.

Clause 3. The wing-fuselage truss joint assembly of clauses 1-2 wherein the right truss link member pivotally connects from an aft-right wing truss joint to the forward-right wing truss joint and the left truss link member pivotally connects from an aft-left wing truss joint to the forward-left wing truss joint.

Clause 4. The wing-fuselage truss joint assembly of clauses 1-3 wherein a first aft truss member connects from an aft bulkhead to an aft-right wing truss joint and a second aft truss member connects from the aft bulkhead to an aft-left wing truss joint.

Clause 5. The wing-fuselage truss joint assembly of clauses 1-4 wherein the forward wing truss joint comprises a pivot bar configured to pivotally connect with the at least one interconnecting member.

Clause 6. The wing-fuselage truss joint assembly of clauses 1-5 wherein the pivot bar is configured to pivot in a first direction, the first direction being a lateral direction aligned with the wing.

Clause 7. The wing fuselage joint assembly of clauses 1-6 wherein the left diagonal linking member and the right diagonal linking member pivot in a second direction, the second direction being a longitudinal direction aligned with the fuselage.

Clause 8. The wing-fuselage truss joint assembly of clauses 1-7 wherein the right truss link member and the left truss link member are each configured to pivot in the second direction.

Clause 9. The wing-fuselage truss joint assembly of clauses 1-8, wherein the joining members, the at least one interconnecting member, the left and right diagonal linking members, and the left and right truss link members are configured to substantially reduce forces experienced by the wing from being transferred to a fuselage structure.

Clause 10. A wing-fuselage truss joint assembly for an aircraft comprising: a forward-left joining member, an aft-left joining member, a forward-right joining member, and an aft-right joining member configured to join a wing to a fuselage, wherein each of the joining members comprises: a wing truss joint mechanically coupled to a spar of the wing; a fuselage truss joint mechanically coupled to a bulkhead of the fuselage; and an upright member pivotally coupled to the wing truss joint at a first end and pivotally coupled to the fuselage truss joint at a second end; an interconnecting joint mechanically coupled to a forward bulkhead between the forward-left joining member and the forward-right joining member; a first interconnecting member and a second interconnecting member wherein the first interconnecting member is pivotally coupled to the interconnecting joint and pivotally coupled to a forward-right wing truss joint and the second interconnecting member is pivotally coupled to the interconnecting joint and pivotally coupled to a forward-left wing truss joint; a right linking member pivotally coupled to an aft-right wing truss joint and pivotally coupled to the forward-right wing truss joint; and a left linking member pivotally coupled to an aft-left wing truss joint and pivotally coupled to the forward-left wing truss joint; a left diagonal linking member pivotally coupled to an aft-left fuselage truss joint and pivotally coupled to the forward-left wing truss joint; and a right diagonal linking member pivotally coupled to an aft-right fuselage truss joint and pivotally coupled to the forward-right wing truss joint.

Clause 11. The wing-fuselage truss joint assembly of clause 10 including a first aft truss member connecting from an aft bulkhead to the aft-right wing truss joint and a second aft truss member connecting from the aft bulkhead to the aft-left wing truss joint.

Clause 12. The wing-fuselage truss joint assembly of clause 10 or 11 wherein the aft-right wing truss joint includes a first pivot bar and the aft-left wing truss joint includes a second pivot bar wherein the first pivot bar is configured to pivotally receive an end of the first aft truss member and the second pivot bar is configured to pivotally receive an end of the second aft truss member.

Clause 13. The wing-fuselage truss joint assembly of clauses 10-12 wherein the first pivot bar and the second pivot bar pivot in a first direction, the first direction being a lateral direction aligned with the wing.

Clause 14. The wing-fuselage truss joint assembly of clauses 10-13 wherein the fuselage truss joint is configured such that the upright member is configured to pivot in the first direction at its second end.

Clause 15. The wing-fuselage truss joint assembly of clauses 10-14 wherein the wing truss joint is configured such that the upright member is configured to pivot in a second direction at its first end, the second direction being a longitudinal direction aligned with the fuselage.

Clause 16. A wing-fuselage truss joint assembly for an aircraft comprising: a forward-left joining member, an aft-left joining member, a forward-right joining member, and an aft-right joining member configured to join a wing to a fuselage, wherein each of the joining members comprises: a wing truss joint mechanically coupled to a spar of the wing; a fuselage truss joint mechanically coupled to a bulkhead of the fuselage; and an upright member pivotally coupled to the wing truss joint at a first end and pivotally coupled to the fuselage truss joint at a second end; an interconnecting joint mechanically coupled to a forward bulkhead between the forward-left joining member and the forward-right joining member; an interconnecting member pivotally coupled to the interconnecting joint and pivotally coupled to a forward wing truss joint; a left diagonal linking member pivotally coupled to an aft-left fuselage truss joint and pivotally coupled to a forward-left wing truss joint; and a right diagonal linking member pivotally coupled to an aft-right fuselage truss joint and pivotally coupled to a forward-right wing truss joint; an aft truss member pivotally coupled from an aft bulkhead to an aft wing truss joint.

Clause 17. The wing-fuselage joint assembly of clause 16 wherein the interconnecting member is pivotally coupled to the forward-left wing truss joint and the aft truss member is pivotally coupled to the aft-right wing truss joint.

Clause 18. The wing-fuselage truss joint assembly of clause 16 or 17 wherein the interconnecting member is pivotally coupled to the forward-right wing truss joint and the aft truss member is pivotally coupled to the aft-left wing truss joint.

Clause 19. The wing fuselage truss joint assembly of clauses 16-18 wherein the forward-left wing truss joint and the forward-right wing truss joint each include a flanged extension configured to pivot in a second direction, the second direction being a longitudinal direction aligned with the fuselage.

Clause 20. The wing-fuselage joint of clauses 16-19 wherein the left diagonal linking member is pivotally coupled to the flanged extension and the right diagonal linking member is pivotally coupled to the flanged extension.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. A wing-fuselage truss joint assembly for an aircraft comprising:

a forward-left joining member, an aft-left joining member, a forward-right joining member, and an aft-right joining member configured to join a wing to a fuselage, wherein the joining members comprises:

a wing truss joint mechanically coupled to a spar of the wing;

a fuselage truss joint mechanically coupled to a bulkhead of the fuselage; and an upright member pivotally coupled to the wing truss joint at a first end and pivotally coupled to the fuselage truss joint at a second end wherein the second end is received in between opposing sidewalls of a channeled aperture formed into the fuselage truss joint;

an interconnecting joint mechanically coupled to a forward bulkhead between the forward-left joining member and the forward-right joining member;

at least one interconnecting member pivotally coupled to the interconnecting joint and pivotally coupled to a forward wing truss joint;

a left diagonal linking member pivotally coupled directly to an aft-left fuselage truss joint at a left pivotal connection and pivotally coupled to a forward-left wing truss joint, wherein the left pivotal connection is formed into the aft-left fuselage truss joint; and a right diagonal linking member pivotally coupled directly to an aft-right fuselage truss joint at a right pivotal connection and pivotally coupled to a forward-right wing truss joint, wherein the right pivotal connection is formed into the aft-right fuselage truss joint.

2. The wing-fuselage truss joint assembly of claim 1 wherein a right truss link member and a left truss link member each comprise a channeled end with sidewalls spaced apart such that an end of the right diagonal linking member pivotally secures in between the sidewalls of the right truss link member and an end of the left diagonal linking member pivotally secures in between the sidewalls of the left truss link member.

3. The wing-fuselage truss joint assembly of claim 2 wherein the right truss link member pivotally connects from an aft-right wing truss joint to the forward-right wing truss joint and the left truss link member pivotally connects from an aft-left wing truss joint to the forward-left wing truss joint.

4. The wing-fuselage joint assembly of claim 2 wherein the left diagonal linking member and the right diagonal linking member pivot in a second direction, the second direction being a longitudinal direction aligned with the fuselage.

5. The wing-fuselage truss joint assembly of claim 4 wherein the right truss link member and the left truss link member are each configured to pivot in the second direction.

6. The wing-fuselage truss joint assembly of claim 2, wherein the joining members, the at least one interconnecting member, the left and right diagonal linking members, and the left and right truss link members are configured to substantially reduce forces experienced by the wing from being transferred to a fuselage structure.

7. The wing-fuselage truss joint assembly of claim 1 wherein a first aft truss member connects from an aft bulkhead to an aft-right wing truss joint and a second aft truss member connects from the aft bulkhead to an aft-left wing truss joint.

8. The wing-fuselage truss joint assembly of claim 1 wherein the forward wing truss joint comprises a pivot bar configured to pivotally connect with the at least one interconnecting member.

9. The wing-fuselage truss joint assembly of claim 8 wherein the pivot bar is configured to pivot in a first direction, the first direction being a lateral direction aligned with the wing.

10. A wing-fuselage truss joint assembly for an aircraft comprising:

a forward-left joining member, an aft-left joining member, a forward-right joining member, and an aft-right joining member configured to join a wing to a fuselage, wherein the joining members comprises:

a wing truss joint mechanically coupled to a spar of the wing;

a fuselage truss joint mechanically coupled to a bulkhead of the fuselage; and an upright member pivotally coupled to the wing truss joint at a first end and pivotally coupled to the fuselage truss joint at a second end;

an interconnecting joint mechanically coupled to a forward bulkhead between the forward-left joining member and the forward-right joining member;

a first interconnecting member and a second interconnecting member wherein the first interconnecting member is pivotally coupled to the interconnecting joint and pivotally coupled to a forward-right wing truss joint and the second interconnecting member is pivotally coupled to the interconnecting joint and pivotally coupled to a forward-left wing truss joint;

a right linking member pivotally coupled to an aft-right wing truss joint and pivotally coupled to the forward-right wing truss joint; and a left linking member pivotally coupled to an aft-left wing truss joint and pivotally coupled to the forward-left wing truss joint;

a left diagonal linking member pivotally coupled to an aft-left fuselage truss joint and pivotally coupled to the forward-left wing truss joint;

a right diagonal linking member pivotally coupled to an aft-right fuselage truss joint and pivotally coupled to the forward-right wing truss joint;

wherein the right linking member comprises a channeled end with sidewalls spaced apart such that an end of the right diagonal linking member pivotally secures in between the sidewalls at the forward-right wing truss joint, and wherein the left linking member comprises a channeled end with sidewalls spaced apart such that an end of the left diagonal linking member pivotally secures in between the sidewalls at the forward-left wing truss joint.

11. The wing-fuselage truss joint assembly of claim 10 including a first aft truss member connecting from an aft bulkhead to the aft-right wing truss joint and a second aft truss member connecting from the aft bulkhead to the aft-left wing truss joint.

12. The wing-fuselage truss joint assembly of claim 11 wherein the aft-right wing truss joint includes a first pivot bar and the aft-left wing truss joint includes a second pivot bar wherein the first pivot bar is configured to pivotally receive an end of the first aft truss member and the second pivot bar is configured to pivotally receive an end of the second aft truss member.

13. The wing-fuselage truss joint assembly of claim 12 wherein the first pivot bar and the second pivot bar pivot in a first direction, the first direction being a lateral direction aligned with the wing.

14. The wing-fuselage truss joint assembly of claim 13 wherein the fuselage truss joint is configured such that the second end of the upright member is configured to pivot in the first direction.

15. The wing-fuselage truss joint assembly of claim 10 wherein the wing truss joint is configured such that the first end of the upright member is configured to pivot in a second direction, the second direction being a longitudinal direction aligned with the fuselage.

16. A wing-fuselage truss joint assembly for an aircraft comprising:

a forward-left joining member, an aft-left joining member, a forward-right joining member, and an aft-right joining member configured to join a wing to a fuselage, wherein the joining members comprise:

a wing truss joint mechanically coupled to a spar of the wing;

a fuselage truss joint mechanically coupled to a bulkhead of the fuselage; and an upright member pivotally coupled to the wing truss joint at a first end and pivotally coupled to the fuselage truss joint at a second end;

an interconnecting joint mechanically coupled to a forward bulkhead between the forward-left joining member and the forward-right joining member;

an interconnecting member pivotally coupled to the interconnecting joint and pivotally coupled to a forward wing truss joint;

a left diagonal linking member pivotally coupled to an aft-left fuselage truss joint and pivotally coupled to a forward-left wing truss joint;

a right diagonal linking member pivotally coupled to an aft-right fuselage truss joint and pivotally coupled to a forward-right wing truss joint;

an aft truss member pivotally coupled from an aft bulkhead to an aft wing truss joint; and a right truss link member having a channeled end with sidewalls spaced apart such that an end of the right diagonal linking member pivotally secures in between the sidewalls such that the end of the right diagonal linking member is secured to the right truss link member and the forward-right wing truss joint simultaneously.

17. The wing-fuselage joint assembly of claim 16 wherein the interconnecting member is pivotally coupled to the forward-left wing truss joint and the aft truss member is pivotally coupled to the aft-right wing truss joint.

18. The wing-fuselage truss joint assembly of claim 16 wherein the interconnecting member is pivotally coupled to the forward-right wing truss joint and the aft truss member is pivotally coupled to the aft-left wing truss joint.

19. The wing-fuselage truss joint assembly of claim 16 wherein the forward-left wing truss joint and the forward-right wing truss joint each include a flanged extension which downwardly extends and curves to an end configured to receive a truss link member, wherein the flanged extension is configured to pivot in a second direction, the second direction being a longitudinal direction aligned with the fuselage.

20. The wing-fuselage truss joint assembly of claim 19 wherein the left diagonal linking member is pivotally coupled to the flanged extension and the right diagonal linking member is pivotally coupled to the flanged extension.

* * * * *